US010716994B2

(12) United States Patent
Imada

(10) Patent No.: US 10,716,994 B2
(45) Date of Patent: Jul. 21, 2020

(54) USAGE STATE DETERMINATION APPARATUS, USAGE STATE DETERMINATION METHOD, AND PROGRAM

(71) Applicant: Sony Interactive Entertainment Inc., Tokyo (JP)

(72) Inventor: Yoshiyuki Imada, Chiba (JP)

(73) Assignee: Sony Interactive Entertainment Inc., Tokyo (JP)

( * ) Notice: Subject to any disclaimer, the term of this patent is extended or adjusted under 35 U.S.C. 154(b) by 4 days.

(21) Appl. No.: 16/307,656

(22) PCT Filed: Feb. 15, 2017

(86) PCT No.: PCT/JP2017/005525
§ 371 (c)(1),
(2) Date: Dec. 6, 2018

(87) PCT Pub. No.: WO2018/003161
PCT Pub. Date: Jan. 4, 2018

(65) Prior Publication Data
US 2019/0344163 A1    Nov. 14, 2019

(30) Foreign Application Priority Data

Jun. 28, 2016 (JP) ................. 2016-127773

(51) Int. Cl.
*A63F 13/211* (2014.01)
*A63F 13/285* (2014.01)
*G01P 13/00* (2006.01)

(52) U.S. Cl.
CPC .......... *A63F 13/211* (2014.09); *A63F 13/285* (2014.09); *G01P 13/00* (2013.01)

(58) Field of Classification Search
CPC ...... A63F 13/211; A63F 13/285; G01P 13/00; G06F 3/01
See application file for complete search history.

(56) References Cited

U.S. PATENT DOCUMENTS 6,248,017 B1 * 6/2001 Roach ............... A63F 13/08
463/37
9,192,065 B2   11/2015 Minezawa
(Continued)

FOREIGN PATENT DOCUMENTS

| JP | 07306736 A | 11/1995 |
|---|---|---|
| JP | 2008052573 A | 3/2008 |
| WO | 2012023295 A1 | 2/2012 |

OTHER PUBLICATIONS

International Preliminary Report on Patentability and Written Opinion for corresponding PCT Application No. PCT/JP2017/005525, 7 pages, dated Jan. 10, 2019.
(Continued)

*Primary Examiner* — Kevin Y Kim
(74) *Attorney, Agent, or Firm* — Matthew B. Dernier, Esq.

(57) ABSTRACT

Provided are a usage state determination apparatus, a usage state determination method, and a program that prevent a determination from being made that a controller is in use due to vibration of a vibrator. A vibration control section causes a vibrator of the controller to vibrate. A detection result acceptance section accepts a detection result of a controller motion. A usage state determination section determines that the controller is in use on the basis of the detection result of the controller motion. When the vibrator vibrates, the usage state determination section places a restriction on the making of a determination that the controller is in use on the basis of the detection result of the controller motion.

6 Claims, 7 Drawing Sheets

(56) References Cited

U.S. PATENT DOCUMENTS

2008/0174550 A1* 7/2008 Laurila .................. A63F 13/02
  345/158
2010/0095144 A1  4/2010 Yamanaka
2013/0120917 A1  5/2013 Minezawa

OTHER PUBLICATIONS

International Search Report fo corresponding PCT Application No. PCT/JP2017/005525, 2 pages, dated Apr. 25, 2017.
Extended European Search Report for corresponding EP Application EP17819531.9, 6 pages, dated Jan. 8, 2020.
Notification of Reason for Refusal for corresponding JP Application No. JP2018-524878, 9 pages, dated Apr. 23, 2019.

* cited by examiner

| CONTROLLER ID | STATE ID | CONTINUED UNUSED DURATION DATA |
|---|---|---|
| 1 | 3 | 4.00 |
| 2 | 3 | 3.00 |
| 3 | 2 | 0.00 |

FIG.7B

| STATE ID | CONTINUED UNUSED DURATION DATA |
|---|---|
| 2 | 0.00 |

USAGE STATE DETERMINATION APPARATUS, USAGE STATE DETERMINATION METHOD, AND PROGRAM

TECHNICAL FIELD

The present invention relates to a usage state determination apparatus, a usage state determination method, and a program.

BACKGROUND ART

A usage state determination technique is known that makes a determination of the usage state of a controller on the basis of a detection result of an amount of travel of the controller. A power saving technique is also known that performs control, by using such a usage state determination technique, such that when the time period lasts for a given duration for which it has been determined that the controller is not in use, the power for the controller or the power for the apparatus operated by the controller is turned OFF.

SUMMARY

Technical Problem

Some controllers include a motion sensor capable of detecting their own motions. Such controllers can make an operation input to an apparatus by being moved themselves. Also, as for controllers including a motion sensor, a probable application of the above usage state determination technique would be to make a determination on the usage state of the controller on the basis of a detection result of the motion sensor.

Also, some controllers include a vibrator that vibrates in response to an instruction from an apparatus. Here, there is a likelihood that, in the above usage state determination technique, a determination may be made that the controller is in use despite the fact that the user is not using the controller as a result of detection of the motion of the controller caused by the vibration of the vibrator. As a result, for example, in the above power saving technique, even if the time period lasts for the given duration for which the user has not used the controller, the power for the controller or the power for the apparatus operated by the controller is not turned OFF.

The present invention has been devised in light of the above circumstances, and it is an object of the present invention to provide a usage state determination apparatus, a usage state determination method, and a program that prevent a determination from being made that the controller is in use due to vibration of the vibrator.

Solution to Problem

In order to solve the above problem, a usage state determination apparatus according to the present invention includes a vibration control section, a detection result acceptance section, and a usage state determination section. The vibration control section causes a vibrator included in the controller to vibrate. The detection result acceptance section accepts a detection result of the controller motion. The usage state determination section makes a determination regarding the usage state of the controller on the basis of the detection result of the controller motion. When the vibrator is vibrating, the usage state determination section determines that the controller is in use on the basis of the detection result of the controller motion.

In a mode of the present invention, the detection result acceptance section accepts a plurality of kinds of detection results of operation on the controller including the detection results of the controller motion, and the usage state determination section makes a determination regarding the usage state of the controller on the basis of the detection results regarding operation of the controller other than the detection result of the controller motion when the vibrator vibrates.

Also, in a mode of the present invention, the usage state determination apparatus further includes a power control section that turns OFF the power for the controller when the time period lasts for a first duration for which it has been determined that the controller is not in use.

In this mode, the detection result acceptance section may accept, for each of a plurality of controllers, a detection result of the controller motion, the usage state determination section may make a determination regarding the usage state of the controller for each of the plurality of controllers, and the power control section may turn OFF the power for the usage state determination apparatus when the time period lasts for a second duration for which it has been determined that none of the controllers are in use.

Also, a usage state determination method according to the present invention includes a of causing a vibrator included in a controller to vibrate, a step of accepting a detection result of the controller motion, and a step of making a determination regarding the usage state of the controller on the basis of the detection result of the controller motion. In the determination step, when the vibrator vibrates, a restriction is placed on the making of a determination that the controller is in use on the basis of the detection result of the controller motion.

Also, a program according to the present invention causes a computer to perform a procedure of causing a vibrator included in a controller to vibrate, a procedure of accepting a detection result of the controller motion, and a procedure of making a determination regarding the usage state of the controller on the basis of the detection result of the controller motion. In the procedure of determination, when the vibrator vibrates, a restriction is placed on the making of a determination that the controller is in use on the basis of the detection result of the controller motion.

BRIEF DESCRIPTION OF DRAWINGS

FIG. 7B is a diagram illustrating an example of second state management data.

DESCRIPTION OF EMBODIMENT

A description will be given below of an embodiment of the present invention with reference to drawings.

Figure 1:
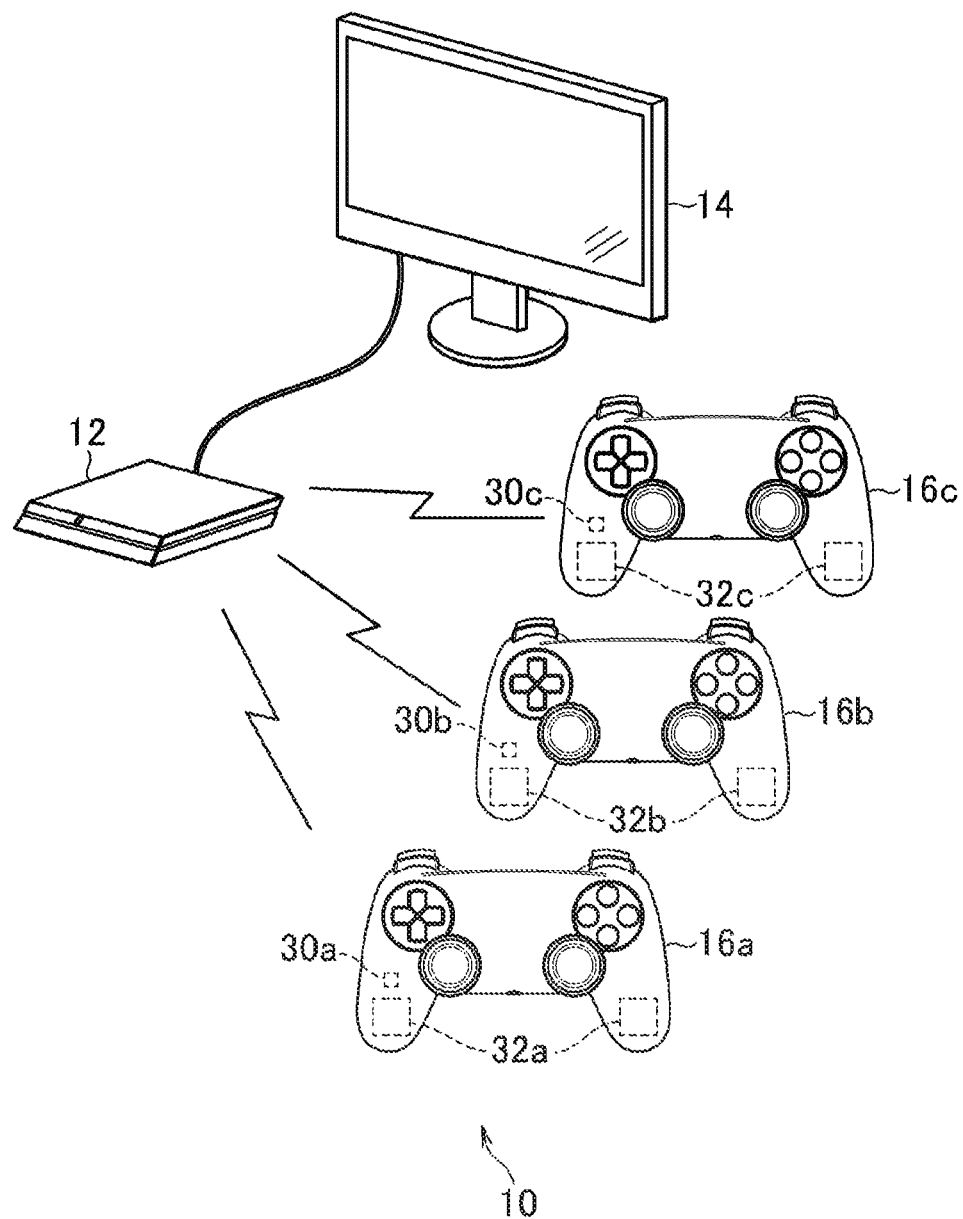
FIG. 1 is a diagram illustrating an example of an overall configuration of an entertainment system according to an embodiment of the present invention.

FIG. 1 is a diagram illustrating an example of an overall configuration of an entertainment system 10 according to an embodiment of the present invention. As illustrated in FIG. 1, the entertainment system 10 according to the present embodiment includes an entertainment apparatus 12, a display 14, and controllers 16 (16a, 16b, and 16c).

The entertainment apparatus 12 according to the present embodiment is a computer such as game console, DVD (Digital Versatile Disc) player, or Blu-ray (registered trademark) player. The entertainment apparatus 12 according to the present embodiment generates images and sounds, for example, by executing a game program stored or reproducing content recorded in an optical disc. Then, the entertainment apparatus 12 according to the present embodiment outputs, to the display 14, a video signal representing an image to be generated and an audio signal representing a sound to be generated.

Figure 2:
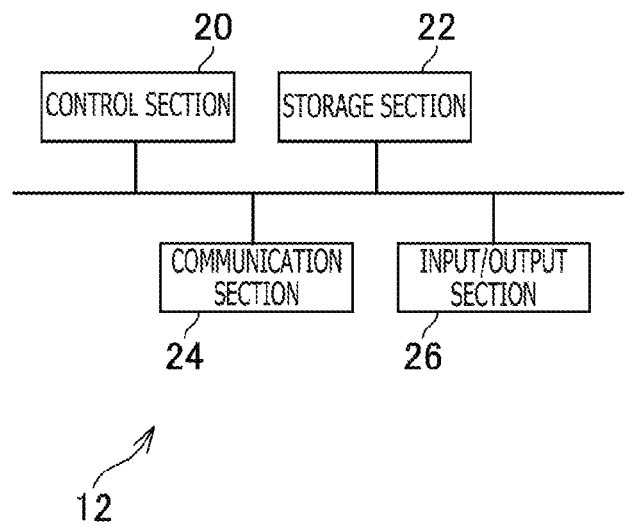
FIG. 2 is a diagram illustrating an example of a configuration of an entertainment apparatus according to an embodiment of the present invention.

FIG. 2 is a diagram illustrating an example of a configuration of the entertainment apparatus 12 according to the present embodiment. The entertainment apparatus 12 according to the present embodiment includes, for example, a control section 20, a storage section 22, a communication section 24, and an input/output section 26 as illustrated in FIG. 2.

The control section 20 is, for example, a program-controlled device such as CPU (Central Processing Unit) that operates in accordance with a program installed in the entertainment apparatus 12. The control section 20 according to the present embodiment includes a GPU (Graphics Processing Unit) that draws images in a frame buffer on the basis of a graphics command supplied from the CPU.

The storage section 22 is a storage element such as ROM (Read-Only Memory) or RAM (Random Access Memory), a hard disk drive, or the like. The storage section 22 stores a program executed by the control section 20 or other program. Also, the storage section 22 according to the present embodiment has a reserved frame buffer area where images are drawn by the GPU.

The communication section 24 is, for example, a communication interface such as Ethernet (registered trademark) module or wireless LAN (Local Area Network) module.

The input/output section 26 is an input/output port such as HDMI (High-Definition Multimedia Interface) (registered trademark) port or USB (Universal Serial Bus) port.

Also, the entertainment apparatus 12 according to the present embodiment has a power button to turn ON or OFF the power for the entertainment apparatus 12. In the present embodiment, when the user presses the power button, the entertainment apparatus 12 is activated.

The display 14 according to the present embodiment is a liquid crystal display or the like and displays a screen or other image generated by the entertainment apparatus 12. Also, the display 14 according to the present embodiment further includes a speaker that outputs sounds represented by audio data generated by the entertainment apparatus 12. The entertainment apparatus 12 and the display 14 are connected, for example, via an AV (Audio and Visual) cable, an HDMI cable, or other type of cable.

The controller 16 according to the present embodiment is an operation input apparatus for making an operation input to the entertainment apparatus 12. The entertainment system 10 according to the present embodiment includes the plurality of controllers 16 (e.g., three controllers 16a, 16b, and 16c here).

The controllers 16 according to the present embodiment have operating members such as digital buttons, analog buttons, operating sticks, and a touch pad. Users can make a variety of operation inputs using the controller 16 by operating these operating members provided on the controller 16.

Also, the controller 16 according to the present embodiment has sensors capable of detecting the amounts of travel of operating members. Then, the controller 16 outputs, to the entertainment apparatus 12, input data associated with the detection result of the amount of travel of the operating member detected by the sensor.

As for a digital button, for example, digital button input data is output to the entertainment apparatus 12 so that "1" is set as a value when the button is pressed and "0" is set as a value when the button is not pressed.

As for an analog button, for example, analog button input data is output to the apparatus 12. The analog button input data has an integer value from 0 or more to 255 or less identified on the basis of the detection result of the amount of downward travel.

Also, as for an operating stick, for example, operating stick input data is output to the entertainment apparatus 12. The operating stick input data has an integer value from 0 or more to 255 or less identified on the basis of the detection result of the tilt for each of horizontal and vertical directions. It should be noted that, in the present embodiment, the state in which "127" is set as input data corresponds to the operating stick in the upright position in each of the horizontal and vertical directions.

Also, for example, as for a touch pad, touch pad input data is output to the entertainment apparatus 12. The touch pad input data has a combination of an X coordinate, an integer from 0 or more to 1919 or less, and a Y coordinate, an integer from 0 or more to 941 or less. It should be noted that the touch pad according to the present embodiment can detect up to two touched positions.

Also, the controller 16 according to the present embodiment includes a motion sensor 30 that detects the acceleration and the angular velocity. For this reason, the controller 16 according to the present embodiment can detect its own motion using the motion sensor 30. FIG. 1 illustrates a motion sensor 30a included in the controller 16a, a motion sensor 30b included in the controller 16b, and a motion sensor 30c included in the controller 16c. The controller 16 outputs, to the entertainment apparatus 12, input data having a value associated with a detection result of the motion sensor 30. For this reason, in the present embodiment, a user can make an operation input to the entertainment apparatus 12 by moving the controller 16 itself. In the present embodiment, motion sensor input data is output to the entertainment apparatus 12. Motion sensor input data has an acceleration value and an angular velocity value specified for each of three directions detected by motion data. It should be noted that the motion sensor 30 is capable of detecting an acceleration ranging from −4G to 4G and an angular velocity ranging from −2000 dps to 2000 dps.

As described above, the entertainment apparatus 12 according to the present embodiment accepts detection results of a plurality of kinds of operations as input data.

Also, the controller 16 according to the present embodiment includes a USB port. Then, the controller 16 can output input data to the entertainment apparatus 12 in a wired manner by being connected to the entertainment apparatus 12 with a USB cable. Also, the controller 16 according to the present embodiment includes a wireless communication module or the like, allowing the controller 16 to output input data to the entertainment apparatus 12 wirelessly.

Also, the controller 16 according to the present embodiment includes a vibrator 32. The vibrator 32 according to the present embodiment is, for example, a vibrating motor. FIG. 1 illustrates a vibrator 32a included in the controller 16a, a vibrator 32b included in the controller 16b, and a vibrator 32c included in the controller 16c. The controller 16 according to the present embodiment incorporates two vibrators 32, one in each of left and right grip sections. In the present embodiment, for example, in the case where an event such as the player being attacked occurs during the execution of a game program in the entertainment apparatus 12, the entertainment apparatus 12 outputs an instruction to the controller 16 to start the vibration of the vibrator 32. As a result, the controller 16 that has received the vibration start instruction causes the vibrator 32 included therein to vibrate. Also, the entertainment apparatus 12 outputs an instruction to the controller 16 to end the vibration of the vibrator 32. As a result, the controller 16 that has received the vibration end instruction causes the vibrator 32 included therein to stop vibrating. It should be noted that, in the present embodiment, a vibration start instruction and a vibration end instruction are output to the controller 16 independently of each other.

Also, the controller 16 according to the present embodiment has a rechargeable battery. Then, the rechargeable battery can be recharged, for example, by power supplied from the entertainment apparatus 12 connected with a USB cable.

Also, the controller 16 has a light bar, an LED (Light-Emitting Diode) that can emit one of a predetermined number of colors, at the bottom center on the rear side.

Also, the controller 16 has a power button to turn ON the power for itself and the power for the entertainment apparatus 12.

Then, the entertainment apparatus 12 according to the present embodiment individually determines whether or not various operating members and the motion sensor 30 included in the controller 16 is not being operated on the basis of the amount of travel on the controller 16.

For example, in the case where a digital button or an analog button is not pressed, that is, in the case where the entertainment apparatus 12 accepts input data whose value is 0, it is determined that the digital button or the analog button is not being operated.

Also, as for an operating stick, for example, in the case where the entertainment apparatus 12 accepts input data whose value falls within a given range of values centered at 127 (e.g., range of values from 95 or more to 159 or less), it is determined that the operating stick is not being operated.

Also, as for a touch pad, for example, in the case where the entertainment apparatus 12 does not accept input data having coordinate values, it is determined that the touch pad is not being operated.

Also, as for the motion sensor 30, for example, in the case where the dispersion of detection results of the angular velocity for the most recent given time period (e.g., one second) demonstrated by input data accepted by the entertainment apparatus 12 is smaller than a given threshold, it is determined that the motion sensor 30 is not being operated.

Then, the entertainment apparatus 12 according to the present embodiment makes a determination regarding the usage state of the controller 16 is in use on the basis of the amount of travel of the controller 16. For example, when it is determined that none of the various operating members and the motion sensor 30 included in the controller 16 are being operated, it is determined that the controller 16 is not in use. Also, in the present embodiment, a determination is made regarding the usage state of each of the controllers 16a, 16b, and 16c at a given sampling rate.

Here, the usage state in the present embodiment is not limited to the state in which an actual operation is performed on the controller 16 by a user. For example, the state in which the controller 16 is likely used by a user such as preparatory stage for operation on the controller 16 may be included in the usage state in the present embodiment. For example, when a user takes the controller 16 in his or her hand to operate a button of the controller 16, it may be determined that the controller is in use.

It should be noted that the above method for determining the usage state is merely an example and that the determination method is not limited to the one described above.

Then, in the present embodiment, the power for the controller 16 and that for the entertainment apparatus 12 are controlled in accordance with the duration in which it is determined that the controller 16 is not in use such that the controller 16 and the entertainment apparatus 12 operate in a power saving manner or are turned OFF.

A further description will be given below of power control for the controller 16 with reference to FIG. 3.

Figure 3:
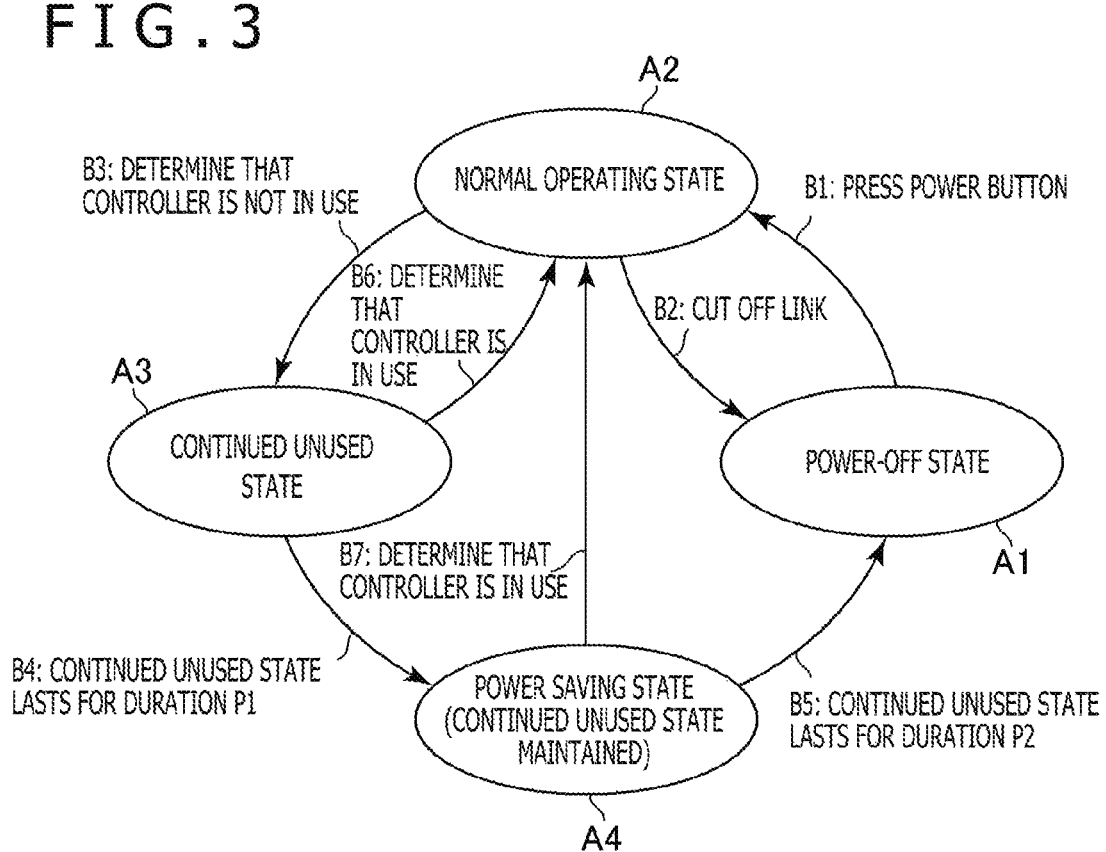
FIG. 3 is a state transition diagram illustrating examples of state transitions of a controller.

FIG. 3 is a state transition diagram illustrating examples of state transitions of the controller 16. Here, the power for the controller 16 is OFF in its initial state, and this state will be referred to as a power-OFF state A1.

Here, when the power button of the controller 16 is pressed, the power for the controller 16 is turned ON (refer to B1 in FIG. 3). This state will be referred to as a normal operating state A2.

When the link between the controller 16 and the entertainment apparatus 12 is cut off in the normal operating state A2, the power for the controller 16 is turned OFF, placing the controller 16 into the power-OFF state A1 (refer to B2 in FIG. 3).

When it is determined in the normal operating state A2 that the controller 16 is not in use, the controller 16 goes into a continued unused state A3 (refer to B3 in FIG. 3).

Then, when the time period lasts for a given duration P1 for which it has been determined that the controller 16 is not in use from when the controller 16 went into the continued unused state A3, the controller 16 changes to power saving operation (refer to B4 in FIG. 3). At this time, the controller 16 may switch to power saving mode. This state will be referred to as a power saving state A4. When the controller 16 goes into the power saving state A4, for example, the light bar of the controller 16 dims, or the interval between communications by the controller 16 becomes longer. It should be noted that the continued unused state A3 will be maintained even in the power saving state A4.

Then, when the time period lasts for a given duration P2 for which it has been determined that the controller 16 is not in use from when the controller 16 went into the continued unused state A3, the power for the controller 16 is turned OFF (refer to B5 in FIG. 3). We assume here that the duration P2 is longer than the duration P1.

When it is determined that the controller 16 is in use in the case where the controller 16 is in the continued unused state A3 or in the power saving state A4, the controller 16 goes into the normal operating state A2 (refer to B6 and B7 in FIG. 3).

It should be noted that some controllers 16 do not include a function to operate in a power saving manner. As for those controllers 16, the power saving state A4 may not be provided. Then, the power for the controller 16 may be turned OFF when the time period lasts for a given duration P2 for which it has been determined that the controller 16 is not in use from when the controller 16 went into the continued unused state A3.

A further description will be given below of power control for the entertainment apparatus 12 with reference to FIG. 4.

Figure 4:
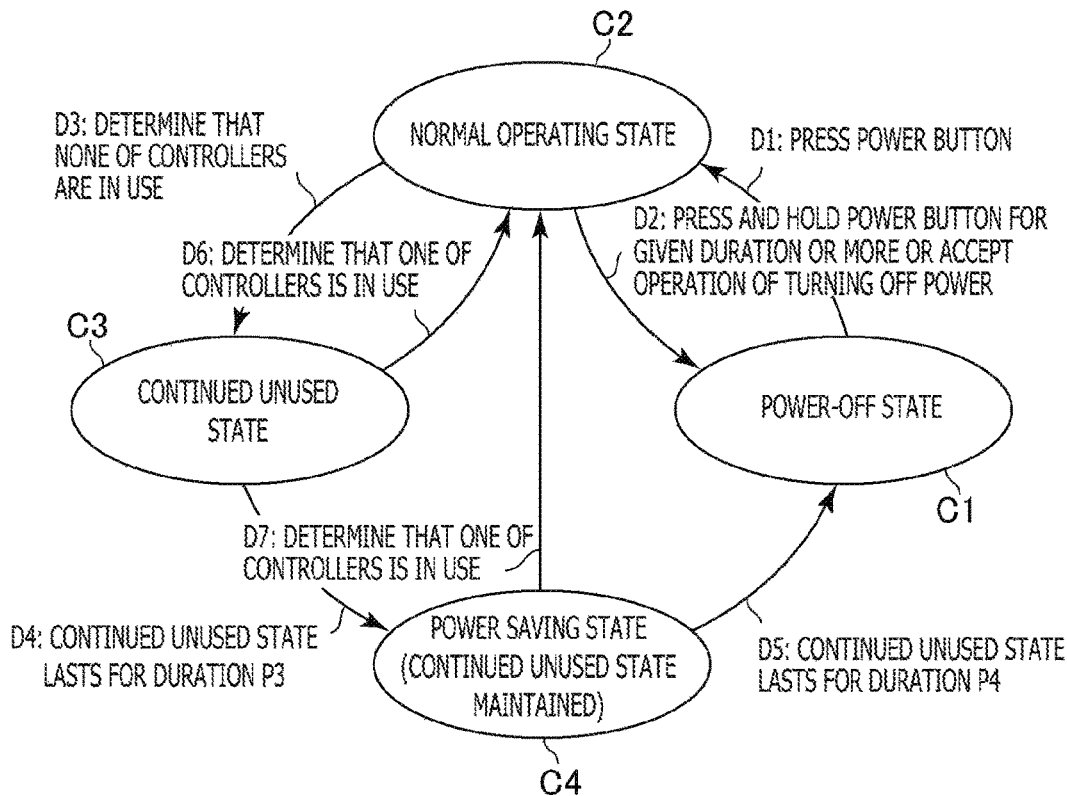
FIG. 4 is a state transition diagram illustrating examples of state transitions of the entertainment apparatus.

FIG. 4 is a state transition diagram illustrating examples of state transitions of the entertainment apparatus 12. Here, the power for the entertainment apparatus 12 is OFF in its initial state, and this state will be referred to as a power-OFF state C1.

Here, when the power button of the entertainment apparatus 12 or the power button of one of the controllers 16 is pressed, the power for the entertainment apparatus 12 is turned OFF (refer to D1 in FIG. 4). This state will be referred to as a normal operating state C2.

We assume, in the normal operating state C2, that the power button of the entertainment apparatus 12 is pressed and held for a given duration or more or that the entertainment apparatus 12 accepts an operation of turning OFF the power from the controller 16. As a result, the power for the entertainment apparatus 12 is turned OFF (refer to D2 in FIG. 4). Then, the entertainment apparatus 12 goes into the power-OFF state C1.

When it is determined in the normal operating state C2 that none of the controllers 16 are in use, the entertainment apparatus 12 goes into a continued unused state C3 (refer to D3 in FIG. 4).

Then, when the time period lasts for a given duration P3 for which it has been determined that the controller 16 is not in use from when the entertainment apparatus 12 went into the continued unused state C3, the entertainment apparatus 12 changes to power saving operation (refer to D4 in FIG. 4). This state will be referred to as a power saving state C4. In the power saving state C4, for example, the entertainment apparatus 12 displays a screen saver on the display 14. Also, the duration P3 may be the same as or different from the duration P1. It should be noted that we assume that the continued unused state C3 is maintained even in the power saving state C4.

Then, when the time period lasts for a given duration P4 for which it has been determined that none of the controllers 16 are in use from when the entertainment apparatus 12 went into the continued unused state C3, the power for the entertainment apparatus 12 is turned OFF (refer to D5 in FIG. 3). We assume here that the duration P4 is longer than the duration P3. Also, the duration P4 may be the same as or different from the duration P2.

When it is determined that one of the controllers 16 is in use in the case where the entertainment apparatus 12 is in the continued unused state C3 or the power saving state C4, the entertainment apparatus 12 goes into the normal operating state C2 (refer to D6 and D7 in FIG. 3).

We assume, for example, that a game program is being executed in the entertainment apparatus 12 in the situation where the above power control takes place in the entertainment system 10. When a game program is executed as described above, the entertainment apparatus 12 may output an instruction to the controller 16 to start the vibration of the vibrator 32 in response to a game playing status. As a result, the vibrator 32 of the controller 16 vibrates in response to the vibration start instruction.

Here, the controller 16 according to the present embodiment includes the motion sensor 30 as described above. Then, there is a likelihood that a determination may be made that the controller 16 is in use as a result of detection of the motion of the controller 16 caused by the vibration of the vibrator 32 by the motion sensor 30. Specifically, for example, there is a likelihood that the dispersion of detection results of the angular velocity for the most recent time period (e.g., one second) may be larger than a given threshold due to the vibration of the vibrator 32 despite the fact that the user is not subjectively operating the controller 16.

Figure 5:
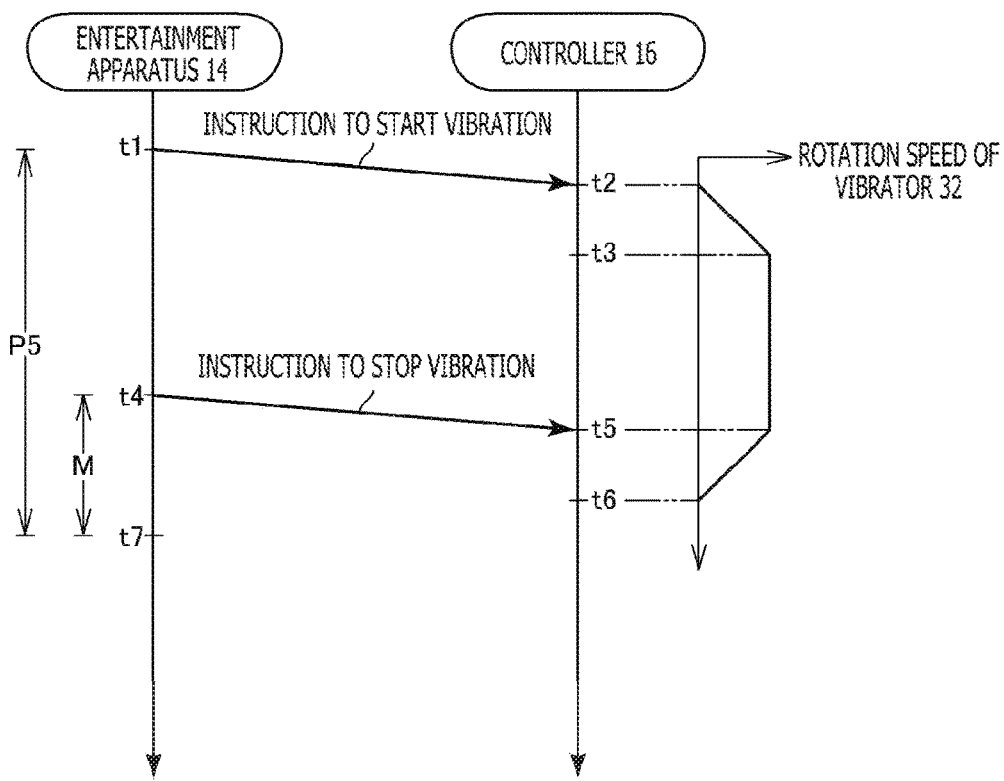
FIG. 5 is a diagram schematically illustrating an example of restriction on a usage state determination in an embodiment of the present invention.

For this reason, the entertainment apparatus 12 according to the present embodiment restricts the making of a determination that the controller 16 is in use on the basis of the detection result of the motion of the controller 16 during vibration of the vibrator 32 as illustrated in FIG. 5.

FIG. 5 is a diagram schematically illustrating an example of restriction on the making of a determination regarding the usage state in the present embodiment. We assume, for example, as illustrated in FIG. 5, that the entertainment apparatus 12 outputs an instruction to the controller 16 to start the vibration of the vibrator 32 at time t1 and that the controller 16 accepts the vibration start instruction at time t2. Then, we assume that the vibrator 32 of the controller 16 starts rotating at time t2 and that the rotating speed reaches its maximum at time t3.

We assume that, thereafter, for example, the entertainment apparatus 12 outputs an instruction to the controller 16 to end the vibration of the vibrator 32 at time t4, and the controller 16 accepts the vibration end instruction at time t5. Then, the vibrator 32 of the controller 16 starts to stop rotating and comes to a stop at time t6.

We assume here that the time a given margin time M from time t4 is time t7. It should be noted that an amount of time longer than the amount of time from time t4 to time t6 is preferably specified as the margin time M.

Then, in the present embodiment, a restriction is placed on the making of a determination that the controller 16 is in use on the basis of the detection result of the motion of the controller 16 for the duration P5 from time t1 to time t7.

Also, the time period for which a restriction is placed on the making of a determination that the controller 16 is in use on the basis of the detection result of the motion of the controller 16 is not limited to that described above. For example, the time period from time t1 to time t6, the time period from time t2 to time t6, or the time period from time t2 to time t7 may be specified as the duration P5.

It should be noted that, in the present embodiment, the entertainment apparatus 12 accepts a plurality of kinds of detection results of operation on the controller 16 including the detection results of the motion of the controller 16 as described above. For this reason, as for the duration P5, a determination may be made on the usage state of the controller 16 on the basis of the detection result of operation on the controller 16 excluding the motion of the controller 16. In this case, for example, in the case where a digital button is pressed, it is determined that the controller 16 is in use even for the duration P5.

As described above, in the present embodiment, a restriction is placed on the making of a determination that the controller 16 is in use on the basis of the detection result of the motion of the controller 16 during vibration of the vibrator 32. Thus, according to the present embodiment, it is possible to prevent a determination from being made that the controller 16 is in use due to vibration of the vibrator 32.

A further description will be given below of functions of the entertainment apparatus 12 according to the present embodiment and processes performed by the entertainment apparatus 12 with focus on the restriction on the making of a determination regarding usage state.

Figures 6, 7A:
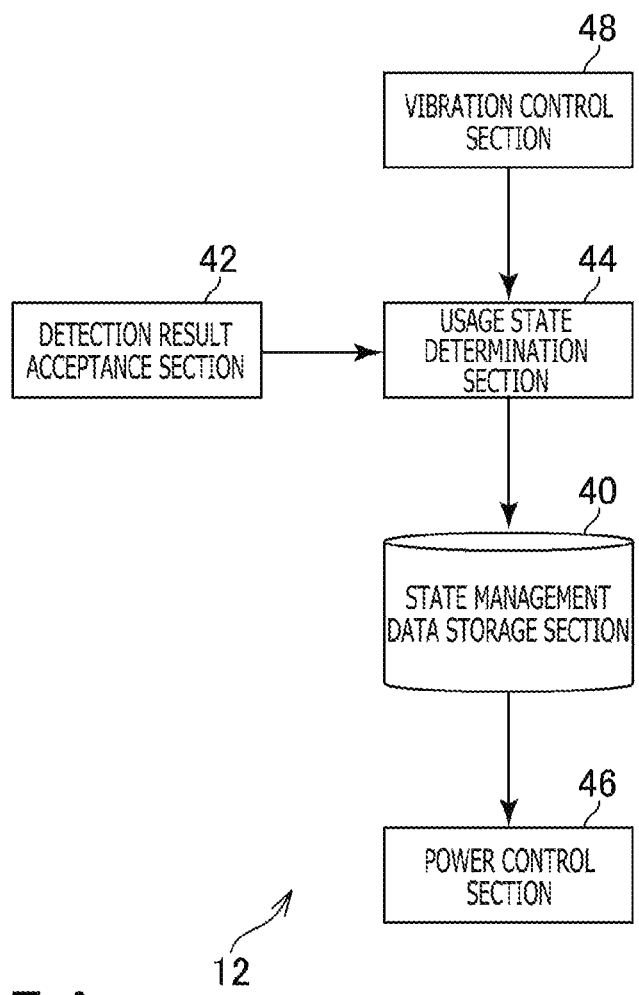
FIG. 6 is a functional block diagram illustrating examples of functions implemented in the entertainment apparatus according to an embodiment of the present invention.
FIG. 7A is a diagram illustrating an example of first state management data.

FIG. 6 is a functional block diagram illustrating examples of functions implemented in the entertainment apparatus 12 according to the present embodiment. It should be noted that all the functions illustrated in FIG. 6 need not be implemented and that a function other than those illustrated in FIG. 6 may be implemented in the entertainment apparatus 12 according to the present embodiment.

As illustrated in FIG. 6, the entertainment apparatus 12 according to the present embodiment functionally includes, for example, a state management data storage section 40, a detection result acceptance section 42, a usage state determination section 44, a power control section 46, and a vibration control section 48. The state management data storage section 40 is primarily implemented as the storage section 22. The detection result acceptance section 42 is primarily implemented as the communication section 24 and the input/output section 26. The usage state determination section 44 and the power control section 46 are primarily implemented as the control section 20. The vibration control section 48 is primarily implemented as the control section 20, the communication section 24, and the input/output section 26. In the present embodiment, the entertainment apparatus 12 plays a role of a usage state determination apparatus that makes a determination regarding the usage states of the controller 16 and the entertainment apparatus 12.

The above functions may be implemented as a result of execution of a program including instructions corresponding to the above functions installed in the entertainment apparatus 12, a computer, by the control section 20. This program may be supplied via a computer-readable information storage media such as optical disc, magnetic disk, magnetic tape, magneto-optical disk, or flash memory or via the Internet or other network to the entertainment apparatus 12.

The state management data storage section 40 stores first state management data and second state management data. The first state management data manages the states of the respective controllers 16 illustrated in FIG. 7A. The second state management data manages the state of the entertainment apparatus 12 illustrated in FIG. 7B.

The first state management data illustrated in FIG. 7A includes, for example, controller IDs (Identifiers), state IDs, and continued unused duration data. The controller IDs illustrated in FIG. 7A are, for example, controller identification information. We assume here, for example, that the controller IDs of the controller 16a, the controller 16b, and the controller 16c are "1," "2," and "3," respectively. The state IDs illustrated in FIG. 7A are, for example, identification information regarding the states of the controllers 16. As the state ID illustrated in FIG. 7A, "1," the value associated with the state A1, "2," the value associated with the state A2, "3," the value associated with the state A3, or "4," the value associated with the state A4, is specified. The continued unused duration data illustrated in FIG. 7A is, for example, data representing the duration for which it has been determined that the controller 16 is not in use from when the controller 16 went into the continued unused state A3. In the present embodiment, we assume that the unit of the duration indicated by the continued unused duration data illustrated in FIG. 7A is in seconds.

The second state management data illustrated in FIG. 7B includes a state ID and continued unused duration data. The state ID includes, for example, a state ID that is identification information regarding the state of the entertainment apparatus 12. As the state ID illustrated in FIG. 7B, "1," the value associated with the state C1, "2," the value associated with the state C2, "3," the value associated with the state C3, or "4," the value associated with the state C4, is specified. The continued unused duration data illustrated in FIG. 7B is, for example, data representing the duration for which it has been determined that none of the controllers 16 are in use from when the entertainment apparatus 12 went into the continued unused state C3. In the present embodiment, we assume that the unit of the duration indicated by the continued unused duration data illustrated in FIG. 7B is in seconds.

In the present embodiment, for example, the detection result acceptance section 42 accepts detection results of sensors capable of detecting the amounts of travel of the various operating members described above and detection results of the motions of the controllers 16 by the motion sensors 30. The detection result acceptance section 42 accepts, from the controller 16, input data associated with the detection results of the sensors capable of detecting the amounts of travel of operating members or the detection result of the motion sensor 30. As described above, the detection result acceptance section 42 may accept, for each of the plurality of controllers 16, input data associated with detection results of the operating members and the motion sensor 30 of the controller 16 from the controller 16.

In the present embodiment, for example, the usage state determination section 44 makes a determination regarding the usage state of the controller 16 on the basis of the detection result accepted by the detection result acceptance section 42. The usage state determination section 44 may make a determination regarding the usage state of each of the plurality of controllers 16 as described above.

For example, the usage state determination section 44 determines, for each of the plurality of operating members included in the controller 16 and on the basis of input data of the operating member, whether or not the operating member is not being operated. Also, the usage state determination section 44 determines, on the basis of input data of the motion sensor 30, whether or not the motion sensor 30 is not being operated.

Then, when determining that none of all the operating members and the motion sensor 30 included in the controller 16 are being operated, the usage state determination section 44 determines that the controller 16 is not in use. On the other hand, when determining that any of the operating members and the motion sensor 30 included in the controller 16 is being operated, the usage state determination section 44 determines that the controller 16 is in use.

Then, the usage state determination section 44 updates the state ID value of the first state management data on the basis of the determination result regarding the usage state of the controller 16 and in accordance with the state transitions illustrated in the state transition diagram depicted in FIG. 3.

Also, when it is determined that the controller 16 is not in use in the case where the state ID value of the first state management data is "3" or "4," the usage state determination section 44 increments the value of the continued unused duration data included in the first state management data.

Then, the usage state determination section 44 updates, for each of the controllers 16, the state ID value of the second state management data on the basis of the determination result regarding the usage state of the controller 16 and in accordance with the state transitions illustrated in the state transition diagram illustrated in FIG. 4.

Also, when it is determined that none of the controllers 16 are in use in the case where the state ID value of the second state management data is "3" or "4," the usage state determination section 44 increments the value of the continued unused duration data included in the second state management data.

In the present embodiment, for example, the power control section 46 controls the controller 16 to operate in a power saving manner when the time period lasts for the duration P1 for which it has been determined that the controller 16 is not in use. The power control section 46 may, for example, control the controller 16 associated with the first state management data to operate in a power saving manner in the case where the value of the continued unused duration data included in the first state management data reaches P1 or higher. Here, for example, the power control section 46 may output an instruction to the controller 16 to operate in a power saving manner when the time period lasts for the duration P1 for which it has been determined that the controller 16 is not in use. Then, the controller 16 that accepts the power saving operation instruction may start to operate in a power saving manner.

Also, in the present embodiment, for example, the power control section 46 turns OFF the power for the controller 16 when the time period lasts for the duration P2 for which it has been determined that the controller 16 is not in use. The power control section 46 may, for example, turn OFF the controller 16 associated with the first state management data in the case where the value of the continued unused duration data included in the first state management data reaches P2 or higher. Here, for example, the power control section 46 may output an operation instruction to the controller 16 to turn OFF the power when the time period lasts for the duration P2 for which it has been determined that the controller 16 is not in use. Then, the controller 16 that accepts the power-OFF operation instruction may turn OFF the power for the controller 16.

Also, in the present embodiment, for example, the power control section 46 controls the entertainment apparatus 12 to operate in a power saving manner when the time period lasts for the duration P3 for which it has been determined that none of the plurality of controllers 16 are in use. The power control section 46 may, for example, control the entertainment apparatus 12 to operate in a power saving manner in the case where the value of the continued unused duration data included in the second state management data reaches P3 or higher.

Also, in the present embodiment, for example, the power control section 46 turns OFF the power for the entertainment apparatus 12 when the time period lasts for the duration P4 for which it has been determined that none of the plurality of controllers 16 are in use. The power control section 46 may, for example, turn OFF the power for the entertainment apparatus 12 in the case where the value of the continued unused duration data included in the second state management data reaches P4 or higher.

In the present embodiment, for example, the vibration control section 48 causes the vibrator 32 included in the controller 16 to vibrate. For example, the vibration control section 48 outputs, to each of the controllers 16, an instruction to start the vibration of the vibrator 32 and an instruction to end the vibration of the vibrator 32. The vibration control section 48 according to the present embodiment outputs vibration start and end instructions independently to each of the controllers 16. For example, the vibration control section 48 outputs instructions to the controller 16a to start and end the vibration of the vibrator 32a. Also, the vibration control section 48 outputs, for example, instructions to the controller 16b to start and end the vibration of the vibrator 32b. The vibration control section 48 outputs, for example, instructions to the controller 16c to start and end the vibration of the vibrator 32c.

Then, the usage state determination section 44 places a restriction on the making of a determination that the controller 16 is in use on the basis of the detection result of the motion of the controller 16 when the vibrator 32 of the controller vibrates. Here, for example, the usage state determination section 44 may place a restriction on the making of a determination that the controller 16 is in use on the basis of the detection result of the motion of the controller 16 as described above for the duration P5 illustrated in FIG. 5.

In this case, for the duration P5, the usage state determination section 44 may make a determination regarding the usage state of the controller 16 on the basis of detection results regarding operation of the controller 16 other than the detection result of the motion of the controller 16. For example, a determination may be made regarding the usage state of the controller 16 on the basis of input data for each of the variety of operating members (e.g., digital buttons, analog buttons, operating sticks, and touch pad). A determination made regarding the usage state on the basis of detection results regarding operation of the controller 16 other than the detection result of the motion of the controller 16 will be hereinafter referred to as a limited usage state determination. On the other hand, a determination made regarding the usage state on the basis of detection results regarding operation of the controller 16 including the detection result of the motion of the controller 16 will be hereinafter referred to as an unlimited usage state determination.

Figure 8A:
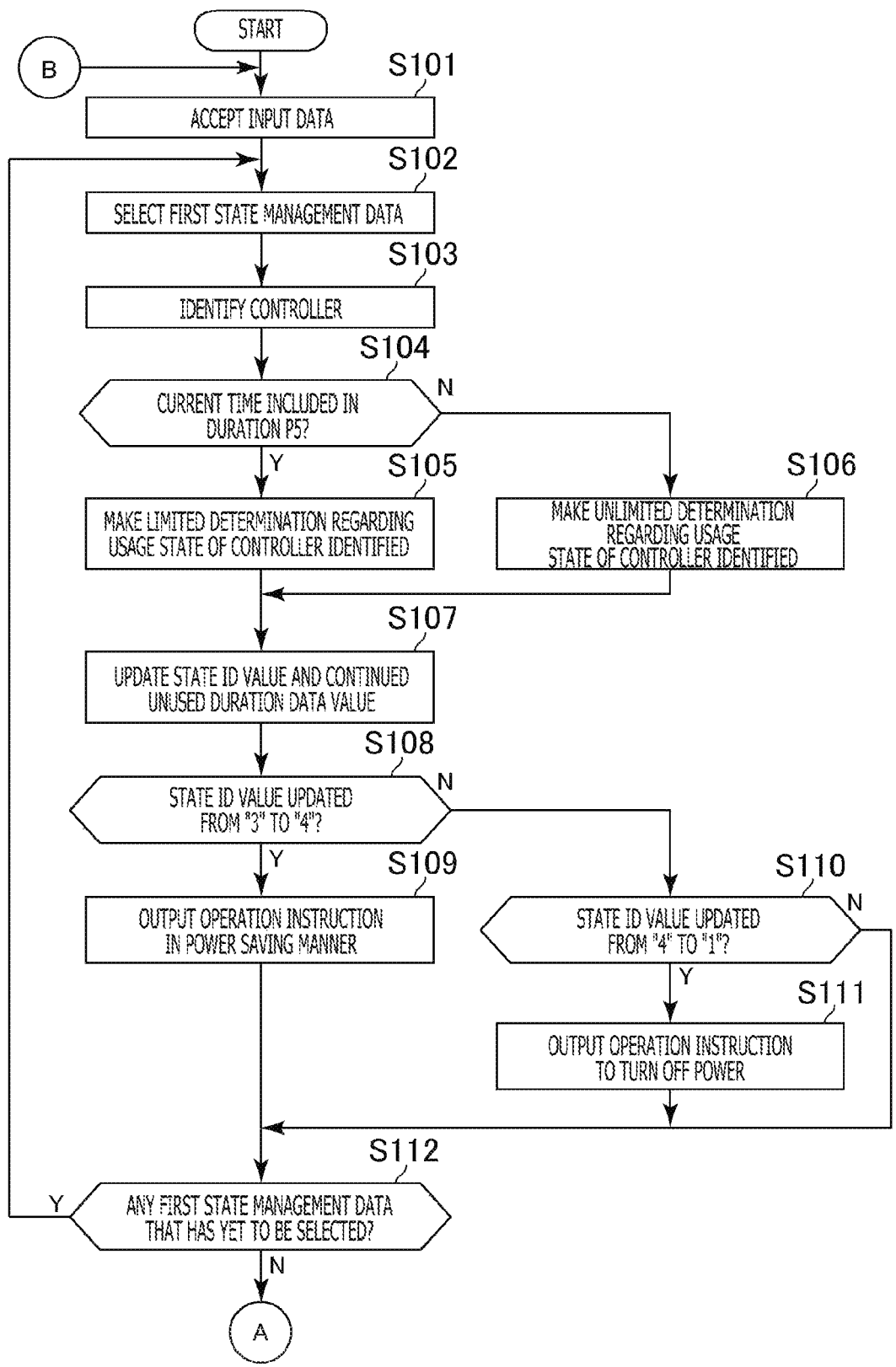
FIG. 8A is a flowchart illustrating an example of a flow of processes performed by the entertainment apparatus according to an embodiment of the present invention.
Figure 8B:
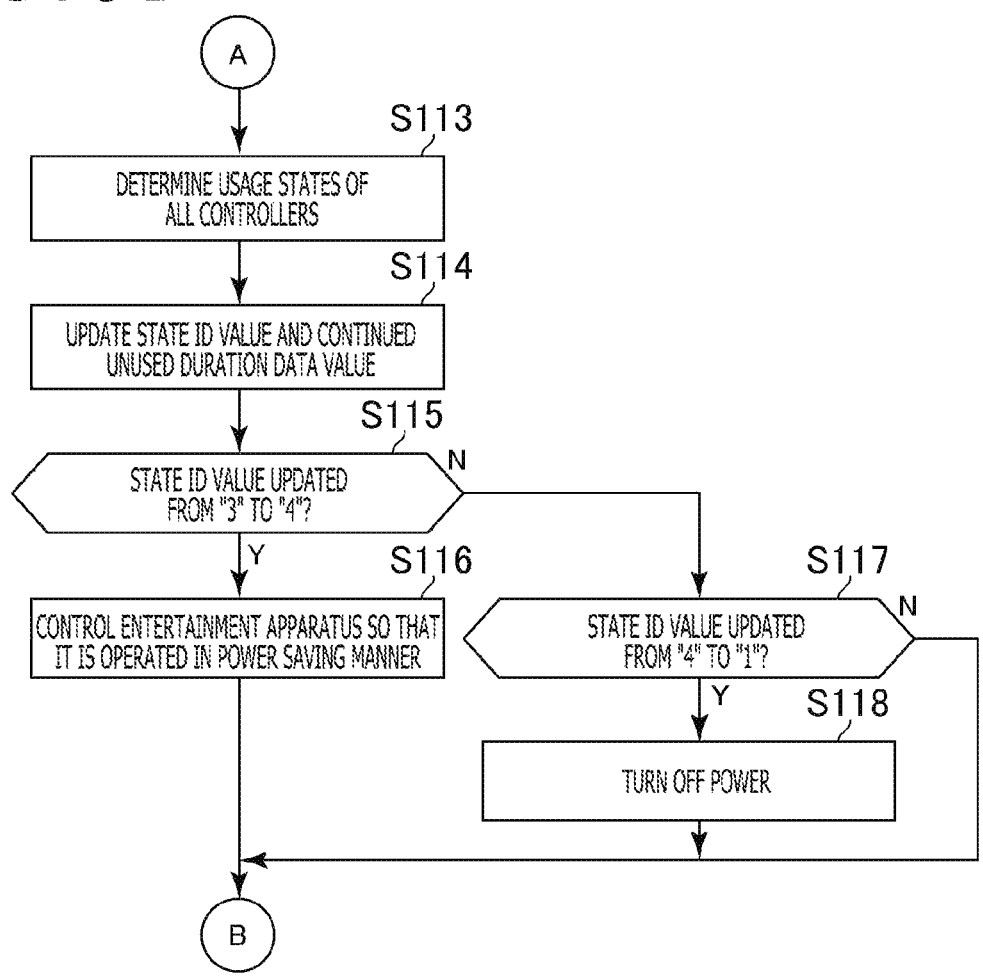
FIG. 8B is a flowchart illustrating an example of a flow of processes performed by the entertainment apparatus according to an embodiment of the present invention.

A description will be given below of an example of a flow of processes performed by the entertainment apparatus 12 according to the present embodiment with reference to the flowchart illustrated in FIGS. 8A and 8B. In the present embodiment, the following processes depicted in S101 to S118 are repeated at a given sampling rate as described below. In the present processing example, we assume that the power for the entertainment apparatus 12 and that for all the controllers 16 are ON.

Also, the detection result acceptance section 42 accepts, from each of the controllers 16 for which the power is not OFF, input data associated with the detection results of the sensors capable of detecting the amounts of travel of the operating members included in the controller 16 and the detection result of the motion sensor 30 (S101).

Then, the usage state determination section 44 selects, of the first state management data stored in the state management data storage section 40 and whose state ID value is not "1," a piece of the first state management data that has yet to be selected in the processes illustrated in the present processing example (S102).

Then, the usage state determination section 44 identifies the controller 16 associated with the piece of the first state management data selected in the process depicted in S102 (S103).

Then, the usage state determination section 44 determines, on the basis of timings of vibration start and end instructions output from the vibration control section 48 to the controller 16 identified in the process depicted in S103, whether or not the current time is included in the duration P5 for the controller 16 (S104).

We assume that it is determined in the process depicted in S104 that the current time is included in the duration P5 (Y in S104). In this case, the usage state determination section 44 makes a limited usage state determination regarding the controller 16 identified in the process depicted in S103 (S105). Here, for example, the usage state determination section 44 excludes the input data associated with the detection result of the motion sensor 30 from the input data accepted in the process depicted in S101. Then, the usage state determination section 44 makes a determination regarding the usage state of the controller 16 identified in the process depicted in S103 on the basis of the input data after the exclusion. Thus, in the case where it is determined in the process depicted in S104 that the current time is included in the duration P5, the usage state determination section 44 places a restriction on the making of a determination that the controller 16 is in use on the basis of the detection result of the motion of the controller 16.

On the other hand, we assume that it is determined that the current time is not included in the duration P5 (N in S104). In this case, the usage state determination section 44 makes an unlimited usage state determination regarding the usage state of the controller 16 identified in the process depicted in S103 (S106). Here, for example, the usage state determination section 44 makes a determination regarding the usage state of the controller 16 identified in the process depicted in S103 on the basis of all the input data accepted in the process depicted in S101.

Then, the usage state determination section 44 updates the state ID value and the value of the continued unused duration data included in the first state management data selected in the process depicted in S102 on the basis of the determination result in the process depicted in S105 or S106 (S107).

In the process depicted in S107, for example, the state ID value and the value of the continued unused duration data are updated in accordance with the state transition diagram illustrated in FIG. 3.

For example, in the case where it is determined that the controller 16 is not in use when the state ID value is "2," the state ID value is updated to "3."

Also, in the case where it is determined that the controller 16 is not in use when the state ID value is "3" or "4," the value of the continued unused duration data is incremented by the time equivalent to the sampling rate. Then, if the state ID value is "3" and if the incremented value of the continued unused duration data is P1 or higher, the state ID value is updated to "4." Also, if the state ID value is "4" and if the incremented value of the continued unused duration data is P2 or higher, the value of the continued unused duration data is updated to "0," and the state ID value is updated to "1."

On the other hand, in the case where it is determined that the controller 16 is in use when the state ID value is "3" or "4," the value of the continued unused duration data is updated to "0," and the state ID value is updated to "2."

Then, the power control section 46 confirms whether or not the state ID value was updated from "3" to "4" in the process depicted in S107 (S108).

We assume that it is confirmed in the process depicted in S108 that the state ID value was updated from "3" to "4" in the process depicted in S107 (Y in S108). In this case, the power control section 46 outputs an instruction to the controller 16, identified by the process depicted in S103, to operate in a power saving manner (S109). Then, the controller 16 that has received the power saving operation instruction starts to operate in a power saving manner.

We assume that it is not confirmed in the process depicted in S108 that the state ID value was updated from "3" to "4" in the process depicted in S107 (N in S108). In this case, the power control section 46 confirms whether or not the state ID value was updated from "4" to "1" in the process depicted in S107 (S110).

We assume that it is confirmed in the process depicted in S110 that the state ID value was updated from "4" to "1" in the process depicted in S107 (Y in S110). In this case, the power control section 46 outputs an operation instruction to the controller 16, identified by the process depicted in S103, to turn OFF the power (S111). Then, the controller 16 that has received the operation instruction to turn OFF the power turns OFF the power for the controller 16.

We assume that it is not confirmed in the process depicted in S110 that the state ID value was updated from "4" to "1" in the process depicted in S107 (N in S110) or that the process depicted in S109 or S111 is terminated. In this case, the usage state determination section 44 confirms whether or not there is first state management data that is not selected in the process depicted in S102 and whose state ID value is not "1" (S112).

In the case where it is confirmed that there is first state management data that is not selected in the process depicted in S102 and whose state ID value is not "1" (Y in S112), the process returns to the process depicted in S102.

On the other hand, we assume that it is confirmed that there is no first state management data that is not selected in the process depicted in S102 and whose state ID value is not "1" (N in S112). In this case, the usage state determination section 44 makes a determination regarding the usage states of all the controllers 16 on the basis of all the first state management data stored in the state management data storage section 40 (S113). Here, for example, it is determined that none of the controllers 16 are in use in the case where the state ID values of all the pieces of the first state management data are "1," "3," or "4."

Then, the usage state determination section 44 updates the state ID value and the value of the continued unused duration data included in the second state management data stored in the state management data storage section 40 on the basis of the determination result of the process depicted in S113 (S114).

In the process depicted in S114, the state ID value and the value of the continued unused duration data are updated in accordance with the state transition diagram illustrated in FIG. 4.

For example, in the case where it is determined that all the controllers 16 are in use when the state ID value is "2," the state ID value is updated to "3."

Also, for example, in the case where it is determined that none of the controllers 16 are in use when the state ID value is "3" or "4," the value of the continued unused duration data is incremented by the time equivalent to the sampling rate. Then, if the state ID value is "3" and if the incremented value of the continued unused duration data is P3 or higher, the state ID value is updated to "4." Also, if the state ID value is "4" and if the incremented value of the continued unused duration data is P4 or higher, the value of the continued unused duration data is updated to "0," and the state ID value is updated to "1."

On the other hand, in the case where it is determined that one of the controllers 16 is in use when the state ID value is "3" or "4," the value of the continued unused duration data is updated to "0," and the state ID value is updated to "2."

Then, the power control section 46 confirms whether or not the state ID value was updated from "3" to "4" in the process depicted in S114 (S115).

We assume that it is confirmed in the process depicted in S115 that the state ID value was updated from "3" to "4" in the process depicted in S114 (Y in S115). In this case, the power control section 46 controls the entertainment apparatus 12 to operate in a power saving manner (S116).

We assume that it is not confirmed in the process depicted in S115 that the state ID value was updated from "3" to "4" in the process depicted in S114 (N in S115). In this case, the power control section 46 confirms whether or not the state ID value was updated from "4" to "1" in the process depicted in S115 (S117).

We assume that it is confirmed in the process depicted in S117 that the state ID value was updated from "4" to "1" in the process depicted in S114 (Y in S117). In this case, the power control section 46 turns OFF the power for the entertainment apparatus 12 (S118).

In the case where it is not confirmed in the process depicted in S117 that the state ID value was updated from "4" to "1" in the process depicted in S114 (N in S117) or that the process depicted in S116 or S118 is terminated, the process returns to the process depicted in S101.

In the present embodiment, the above processes depicted in S101 to S118 are repeated at a given sampling rate.

It should be noted that the present invention is not limited to the above embodiment.

For example, when the controller 16 goes into the continued unused state A3 or the power saving state A4, the vibration control section 48 may perform control such that a vibration start instruction is not output to the controller 16. This ensures that the vibrator 32 will not vibrate, thereby eliminating the likelihood of cancellation of the continued unused state A3 or the power saving state A4 due to the vibration of the vibrator 32.

Also, for example, the usage state determination section 44 may make a determination regarding the usage state of the controller 16 on the basis of the detection results regarding operation of the controller 16 other than the motion of the controller 16 irrespective of whether or not the current time is included in the above duration P5. That is, a determination may be made regarding the usage state of the controller 16 on the basis of input data excluding input data associated with the detection result of the motion sensor 30 irrespective of whether or not the current time is included in the above duration P5.

Also, for example, in the case where the current time is included in the above duration P5, the threshold of the dispersion of detection results of the angular velocity for the most recent given time period (e.g., one second) being determined that the motion sensor 30 is not being operated may be increased. For example, in the case where the current time is included in the above duration P5, a threshold greater than the dispersion of detection results of the angular velocity due to the vibration of the vibrator 32 may be specified as a threshold of the dispersion of detection results of the angular velocity for the most recent given time period (e.g., one second).

Also, for example, the entertainment apparatus 12 may include a timer control section that controls the timer used to identify the timing when the controller 16 switches to operation in a power saving manner (switches to power saving mode) on the basis of the detection result of the motion of the controller 16. In the above example, the usage state determination section 44 plays a role of the timer control section.

Here, the timer control section may restrict the resetting of the timer used to identify the timing when the controller 16 switches to operation in a power saving manner on the basis of the detection result of the motion of the controller 16 when the vibrator 32 of the controller vibrates. In this case, the timer may be controlled on the basis of the detection results regarding operation of the controller 16 other than the motion of the controller 16. Here, for example, whether or not to reset the timer may be controlled on the basis of the detection results regarding operation of the controller 16 other than the motion of the controller 16.

Also, as described above, the power control section 46 may switch the controller to operation in a power saving manner (switch the controller to power saving mode) when the time measured by the timer associated with the controller 16 exceeds the time equivalent to the duration P1. Also, the power control section 46 may turn OFF the power for the controller when the time measured by the timer associated with the controller 16 exceeds the time equivalent to the duration P2.

For example, the timer control section may perform control such that the timer associated with the controller 16 starts to measure the time when the controller 16 goes into the continued unused state A3. Then, the power control section 46 may switch the controller 16 to operation in a power saving manner (switch the controller 16 to power saving mode) when the time measured by the timer exceeds the time equivalent to the above duration P1. Also, the power control section 46 may turn OFF the power for the controller 16 when the time measured by the timer exceeds the time equivalent to the above duration P2. Also, the power control section 46 may reset the timer associated with the controller 16 when the controller 16 goes into the power-OFF state A1 or the normal operating state A2. That is, the power control section 46 may update the measured time of the timer to "0."

Also, the timer control section may control the timer used to identify the timing when the controller 16 switches to operation in a power saving manner (switches to power saving mode) on the basis of the detection result of the motion of each of the controllers 16. Also, as described above, the power control section 46 may switch the entertainment apparatus 12 to operation in a power saving manner (switch the entertainment apparatus 12 to power saving mode) when the time measured by the timer associated with the entertainment apparatus 12 exceeds the time equivalent to the duration P3. Also, the power control section 46 may turn OFF the power for the entertainment apparatus 12 when the time measured by the timer associated with the entertainment apparatus 12 exceeds the time equivalent to the duration P4.

For example, the timer control section may perform control such that the timer associated with the entertainment apparatus 12 starts to measure the time when the entertainment apparatus 12 goes into the continued unused state C3. Then, the power control section 46 may switch the entertainment apparatus 12 to operation in a power saving manner (switch the entertainment apparatus 12 to power saving mode) when the time measured by the timer associated with the entertainment apparatus 12 exceeds the time equivalent to the duration P3. Also, the power control section 46 may turn OFF the power for the entertainment apparatus 12 when the time measured by the timer exceeds the time equivalent to the above duration P4. Also, the power control section 46 may reset the timer associated with the entertainment apparatus 12 when the entertainment apparatus 12 goes into the power-OFF state C1 or the normal operating state C2.

It should be noted that a hardware timer provided in the entertainment apparatus 12 or a software timer executed by the entertainment apparatus 12 may be used as a timer used to identify the timing when the controller 16 or the entertainment apparatus 12 switches to operation in a power saving manner (switches to power saving mode).

Also, the above timer according to the present embodiment is not limited to a hardware timer or a software timer. We assume that the above timer according to the present embodiment includes data whose value is counted up with time. That is, we assume that the continued unused duration data illustrated in FIGS. 7A and 7B is included in the timer controlled by the timer control section.

It should be noted that the software timer associated with the controller 16 may be activated when the controller 16 goes into the continued unused state A3 and deactivated when the controller 16 goes into the power-OFF state A1 or the normal operating state A2. Also, the software timer associated with the entertainment apparatus 12 may be activated when the entertainment apparatus 12 goes into the continued unused state C3 and deactivated when the entertainment apparatus 12 goes into the power-OFF state C1 or the normal operating state C2.

Also, the present invention is applicable in the case where the entertainment apparatus 12 and the controller 16 communicate in a wired manner.

Also, the above specific character strings and numerical values and the above specific character strings and numerical values in the drawings are illustrative, and the present invention is not limited thereto.

The invention claimed is:

1. A usage state determination apparatus comprising:
a vibration control section adapted to cause a vibrator included in a controller to vibrate;
a detection results acceptance section adapted to accept detection results caused by at least one of controller motion and use of an operating member of the controller; and
a usage state determination section adapted to make a determination regarding a usage state of the controller on the basis of the detection results, wherein
when the vibrator vibrates, the usage state determination section excludes the controller motion from the detection results in determining whether the controller is in use.

2. The usage state determination apparatus of claim 1, wherein
the detection results acceptance section accepts a plurality of kinds of detection results of operation on the controller including controller motion, and
when the vibrator vibrates, the usage state determination section makes a determination regarding the usage state of the controller on the basis of the detection results regarding operation of the controller other than controller motion.

3. The usage state determination apparatus of claim 1, further comprising: a power control section adapted to turn OFF the power for the controller when the time period lasts for a first duration for which it has been determined that the controller is not in use.

4. The usage state determination apparatus of claim 3, wherein
the detection results acceptance section accepts, for each of a plurality of controllers, flail detection results in the form of controller motion,
the usage state determination section makes a determination regarding the usage state of the controller for each of the plurality of controllers, and
the power control section turns OFF the power for the usage state determination apparatus when the time period lasts for a second duration for which it has been determined that none of the controllers are in use.

5. A usage state determination method, comprising:
causing a vibrator included in a controller to vibrate;
accepting flail detection results caused by at least one of controller motion and use of an operating member of the controller; and
making a determination regarding a usage state of the controller on the basis of the detection results,
wherein in making the determination, detection results in the form of controller motion are excluded from the detection results when the vibrator vibrates.

6. A non-transitory, computer readable storage medium containing a computer program, which when executed by a computer, causes the computer to carry out actions, comprising:
causing a vibrator included in a controller to vibrate;
accepting flail detection results caused by at least one of controller motion and use of an operating member of the controller; and
making a determination regarding a usage state of the controller on the basis of the detection results,
wherein in making the determination, detection results in the form of controller motion are excluded from the detection results when the vibrator vibrates.

* * * * *